United States Patent Office 2,709,692
Patented May 31, 1955

2,709,692

POLYARYLENESILOXANE COMPOSITIONS

Gordon C. Gainer, Turtle Creek, Pa., assignor to Westinghouse Electric Corporation, East Pittsburgh, Pa., a corporation of Pennsylvania No Drawing. Application October 22, 1952,
Serial No. 316,306

18 Claims. (Cl. 260—46.5)

This invention relates to polyarylenesiloxane compositions and processes of making and using them in preparing thermoset resinous members.

Previously known resinous siloxane compositions have required heating at extreme elevated temperatures of about 200° C. to 250° C. in order to cure them to a thermoset condition. Furthermore, such compositions have required that heat treatment be carried out for prolonged times. The electrical industry and other industries employing resinous compositions are equipped with ovens, hot presses and other apparatus that are not adapted to operate at the high temperatures required in curing such prior art resinous siloxanes. Furthermore, the extended heat treating schedules, which often require twenty-four hours or more for the curing of a silicone resin on an electrical coil for example, are not adapted to installed conventional conveyorized and other processing equipment. Consequently, it has been a long-felt need that there be available resinous siloxane compositions that will cure at lower temperatures and in shorter periods of time than possible heretofore, and preferably following or approaching the time and temperature schedules used in curing phenolic and alkyd varnishes and resins.

There have been efforts made to produce resinous siloxane compositions that are substantially completely thermosettable from a fluid to a solid state without the evolution of solvent vapors, volatile by-products such as water, etc. However no such resinous siloxane product is commercially available. The resinous siloxane compositions available in the trade at the present time require a volatile solvent, such as toluene, in substantial amounts in order to enable the compositions to be applied as varnishes and dipping compounds. After these siloxane compositions with a volatile solvent are applied to members as coatings or impregnants, they require heat treatment to drive off the volatile solvent and to cause the siloxane residue to react further to attain a thermoset condition, and during such reaction water and other volatiles are given off in abundance. The resulting coatings or impregnants consequently are porous being full of bubbles and having voids and, therefore, are not impermeable to moisture.

No satisfactory completely reactive siloxane composition comparable to the fully reactive "solventless" polyester resins are commercially available. Such completely reactive resinous siloxane compositions would be highly desirable and useful in preparing potted or encapsulated electrical coils and other members as well as having utility in preparing large plastic moldings and other members.

An object of the invention is to provide a solvent-free, partially condensed arylenesiloxane polymer capable of substantially completely reacting at low temperatures to form a solid section substantially free from bubbles and voids.

Another object of the present invention is to provide for the preparation of arylenesiloxane monomers having three hydrolyzable ethoxyl radicals attached asymmetrically to two silicon atoms disposed in para position on a benzene ring.

Another object of the invention is to provide for a partially condensed arylenesiloxane polymer having a single reactive hydroxyl group attached to a silicon atom.

A further object of the invention is to provide for preferentially condensing only certain hydroxyl groups on an arylenesilicon compound while leaving an uncondensed single hydroxyl group on another silicon atom thereof.

A still further object of the invention is to provide for potentially reactive siloxane copolymers containing both (1) saturated hydrocarbon and aromatic hydrocarbon siloxy units and (2) arylene siloxy groups with the latter having one silyl group having an attached uncondensed hydroxyl radical.

For a better understanding of the nature and objects of the invention, reference should be had to the following detailed description.

I have discovered certain monomeric arylene compounds having two silicon atoms attached in the para position with three ethoxyl radicals attached asymmetrically to the two silicon atoms, the remaining valences on the silicon atoms being satisfied by saturated hydrocarbon radicals, preferably methyl radicals, which arylene compounds may be hydrolyzed to replace the ethoxyl radicals with hydroxyl radicals. Further, I have found that in the hydrolysis product, the two hydroxyl radicals attached to a single silicon atom are much more reactive under condensing conditions than the single hydroxyl radical attached to the other silicon atom. By carrying out the condensation under controlled conditions, a preferential reaction can be effected to cause condensation only at the silicon atom having the two hydroxyl radicals whereby fluid linear polymers are produced. The hydroxyl radical on the other silicon atom is not subject to condensation at this time. The resulting fluid composition may be applied to members and thereafter condensation of the residual hydroxyl radical readily effected to produce cross-linking whereby the composition is substantially completely thermoset. This cross-linking may be carried out at quite low temperatures, and even at room temperature, particularly when catalyzed with suitable chemical agents.

Briefly, the monomeric arylene compound of the present invention comprises:

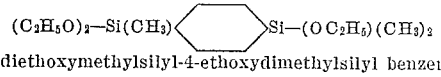

1-diethoxymethylsilyl-4-ethoxydimethylsilyl benzene

The methyl groups may be replaced by other saturated alkyl and hydrocarbon radicals such as ethyl, butyl, phenyl and the like. This monomer may be prepared in a number of ways. The following indicated reaction has resulted in a good yield of this monomer:

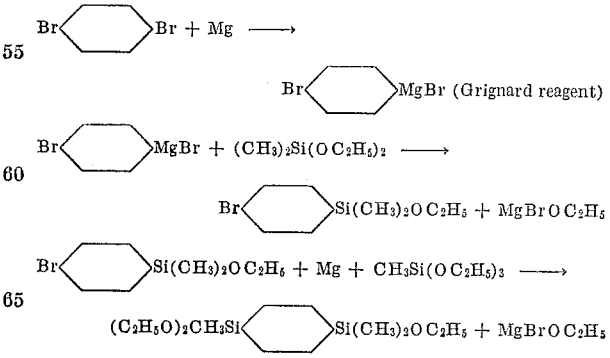

It has been found that the above reaction procedure is critical. Thus if parabromophenylmagnesiumbromide is reacted with methyltriethoxysilane to produce parabromophenyldiethoxymethyl silane, the last mentioned cannot be further reacted by any known laboratory Grignard procedure to substitute a silyl radical for the bromine atom.

Furthermore, if the parabromophenylmagnesiumbromide is reacted with dimethyldichlorosilane to produce parabromophenyldimethylchlorosilane, the latter product cannot be satisfactorily further reacted with magnesium and methyl silicon trichloride to produce 1-dichloromethylsilyl-4-chloromethylsilyl benzene because of the far greater tendency for the reaction to produce linear silane molecules through the chlorine atom of the silane component.

If the 1-diethoxymethylsilyl-4-ethoxydimethylsilylbenzene monomer is subjected to the ordinary hydrolysis and condensation procedures, there will result a cross-linked gelatinous product that will rapidly and spontaneously harden to brittle horny flakes. This last product has no immediate significant utility and is not desirable. However, I have discovered that the 1-diethoxymethylsilyl-4-ethoxydimethylsilylbenzene monomer may be subjected to hydrolysis and condensation under controlled and relatively milder conditions so that only the pairs of hydroxyl radicals at the 1-position are condensed while the single hydroxyl radical at the 4-position remains unaffected. The following examples illustrate these procedures.

EXAMPLE I

A. *Preparation of para-bromophenyldimethylethoxysilane*

One mol of a Grignard reagent comprising parabromophenylmagnesium bromide in ethyl ether was added dropwise to one mol of dimethyldiethoxysilane. After stirring for several hours until the addition was completed, the reacting mixture was permitted to stand until the solids had settled as a sludge. The supernatant liquid was siphoned off and the sludge was filtered through a sintered glass filter and washed with ethyl ether. The liquids and the filtrate were then combined and the liquid was then distilled to remove ether and unreacted dimethyldiethoxysilane. The resulting product was fractionally distilled and one of the fractions isolated was identified as parabromophenyldimethylethoxysilane having a boiling point of 148° C. at 30 mm. and having $n_D^{25}$ 1.5132, $D_4^{25}$ 1.2212.

B. *Preparation of 1-diethoxymethylsilyl-4-ethoxydimethylsilylbenzene*

A solution was prepared from 418 grams (2 moles) of the parabromophenyldimethylethoxysilane and 534 grams (3 moles) of methyltriethoxysilane, all dissolved in 800 ml. of anhydrous ether. This solution was added to a slurry comprising 48.6 grams (2 gram atoms) of magnesium shavings suspended in 200 ml. of anhydrous ether. As the reaction approached completion, salts began to coat the magnesium metal. Heat was applied and the mixture was refluxed for 16 hours. Then the salt slurry was filtered through a sintered glass funnel and the filtrate was transferred to a Claisen distillation apparatus. Ether and unreacted methyltriethoxysilane were distilled off and discarded. The remainder was distilled at a pressure of from one to two mm. Hg and practically all boiled at a temperature of from 80° C. to 120° C. This distillate was then fractionally distilled. A small forerun of approximately 25 milliliters was removed and discarded. Approximately 244.5 grams of a relatively pure product having a boiling point of from 98.5 to 100° C. at 0.5 mm. Hg pressure was obtained. The product obtained was identified as 1-diethoxymethylsilyl-4-ethoxydimethylsilylbenzene. It had a refractive index $n_D^{25}$, 1.4680 and a density $D_4^{25}$ 0.9634.

The 1-diethoxymethylsilyl-4-ethoxydimethylsilylbenzene when subjected to hydrolysis and condensation in the aqueous 5% sulfuric acid formed a white opaque deposit and in several hours a flaky gel formed which was insoluble in benzene or acetone. Tests showed this product to be a thermoset resin. The gel hardened into brittle white horny flakes after standing for a few days. The hydrolysis and condensation conditions had caused the three hydroxyl radicals in the silanol to condense to produce a cross-linked polymer.

EXAMPLE II

*Preferential two-stage condensation of 1-diethoxymethylsilyl-4-ethoxydimethylsilylbenzene*

In order to effect a preferential condensation to produce initially non-cross linked polymers, it has been found desirable to dilute the ethoxy monomer with solvent or with other organosilicon monomers such as dimethyldiethoxysilane, methylphenyldimethoxysilane or 1,4-bis-(ethoxydimethylsilyl)benzene, and to employ a small amount of relatively weak aqueous sulfuric acid as the hydrolysis and condensation catalyst. Thus 15 grams of 1-diethoxymethylsilyl-4-ethoxydimethylsilylbenzene dissolved in 2000 milliliters of toluene may be stirred with 30 milliliters of 5% sulfuric acid. Under these conditions, a fluid siloxane polymer will result which, after the usual procedures of washing and separation from the acid and solvent, will be obtained as a liquid intermediate polymer which is a heavy syrupy body.

It was found that the fluid polymer resulting from this preferential condensation comprised the following recurring units or groups:

As shown, these units have a silanol radical at the 4-position.

The fluid polymer having a single silanol radical per phenyl was admixed with 1% by weight of potassium carbonate and then filtered. The fluid was then placed in an oven at 100° C. and in eight hours, it had set into an infusible insoluble resinous body. Other alkali compounds and organic amines in small amounts of from about 0.001% to 5% by weight catalyze the reaction of these intermediate condensed fluid polymers so that they will form thermoset solids. A small amount of alkali will cause the fluid polymers to thermoset in from a few hours to one or two days at room temperature. Moderate heating increases the rate of thermosetting reaction so that solid bodies may be secured in a period of from a few minutes to several hours at moderate temperatures of from 100° C. to 150° C.

Highly valuable liquid copolymers may be prepared by cohydrolyzing and condensing the 1-diethoxymethylsilyl-4-ethoxydimethylsilylbenzene compound with saturated hydrocarbon ethoxides having the following formula:

$$R_xSi(OC_2H_5)_{(4-x)}$$

where R is a monovalent hydrocarbon radical such as methyl, ethyl, propyl, phenyl, toluene, etc. and $x$ has an average value of from 1.8 to 2.2. It is particularly desirable to use dimethyldiethoxysilane, 1,4-bis-(ethoxydimethylsilyl)benzene, diphenyldiethoxysilane and methylphenyldiethoxysilane in preparing copolymers.

The following examples illustrate these features of the invention.

EXAMPLE III

A mixture was prepared from 22.2 grams (0.15 mole) of dimethyldiethoxysilane and 15.6 grams (0.05 mole) of 1-diethoxymethylsilyl-4-ethoxydimethylsilylbenzene, all being dissolved in 500 milliliters of benzene. This solution was admixed and refluxed with 50 milliliters of 5% aqueous sulfuric acid for two hours. The organic layer was then separated and washed five times with distilled water and the benzene solution was dried. The dry solution was then heated in order to drive off the benzene. The solvent-free copolymer residue was an oily fluid. This oily fluid was treated with a small amount (not exceeding 0.1% by weight) of powdered potassium carbonate. The product, so treated, was heated in an oven for two hours at 130° C. and at the end of this period the product had gelled. After several days at room temperature, the gel had completely converted into a soft transparent thermoset solid. Prolonged heating at elevated temperatures did not cause cracking or forming of voids or softening of the solid polymer.

The addition to the intermediate, partially condensed fluid copolymer of sufficient potassium hydroxide to provide one atom of potassium per 5000 atoms of silicon in the copolymer catalyzed the thermosetting of the fluid so that it formed a gel in several hours at 130° C.

EXAMPLE IV

A solution containing 200 ml. of benzene, 15.6 g. (0.05 mole) of 1-diethoxymethylsilyl-4-ethoxydimethylsilylbenzene and 9.1 g. (0.05 mole) of methylphenyldimethoxysilane was stirred for two hours at room temperature with 50 ml. of 5% aqueous sulfuric acid. (A separate portion of this material gelled when refluxed with 5% sulfuric acid.) The organic layer was separated and washed with water to remove all traces of sulfuric acid. After drying overnight in contact with anhydrous potassium carbonate and anhydrous Drierite, all of the benzene was removed by evaporation at room temperature under vacuum. (A separate portion of the water-free benzene solution gelled when heated to the boiling point of benzene.) After all of the benzene had been removed under vacuum, the liquid copolymer was placed in a beaker and it polymerized overnight at room temperature to form a soft, deep sectioned, rubbery transparent gel, free from voids and bubbles. The gel product was then heated in the 110° C. oven for two hours and was thereupon transferred to a 130° C. oven. A tough, hard, somewhat flexible transparent section was obtained. This material resembled polystyrene in appearance and many physical properties. Tests showed it to be a thermoset polymer which was insoluble and infusible. When a section of the fully polymerized material was heated at 175° C. for approximately one month, the weight loss was only 1.45%.

When 18.2 g. (0.10 mole) of methylphenyldimethoxysilane was substituted for the 9.1 g. of the same compound in the above formulation, and the mixture was treated in the same manner, a softer, more flexible, somewhat tough deep-sectioned polymer was obtained.

EXAMPLE V

A mixture made up of 15.6 g. (0.05 mole) of 1-diethoxymethylsilyl-4-ethoxydimethylsilylbenzene and 14.1 g. (0.05 mole) of 1,4-bis-(ethoxydimethylsilyl)-benzene (the preparation of the latter being set forth hereinafter) was hydrolyzed by rapidly stirring with 50 ml. of 5% sulfuric acid for two hours. The organic layer was separated and washed with water to remove all traces of acid. After thoroughly drying over anhydrous potassium carbonate and Drierite, the resulting liquid copolymer was placed in a small crystallizing dish and set in a 130° C. oven overnight. B next morning, a deep-sectioned, void-free rubbery resin body had formed. On further heating at 175° C., the section became a tough, hard, but somewhat flexible disk.

EXAMPLE VI

A resin solution, similar to that described in the first part of Example III, was prepared by hydrolysis of 15.6 g. (0.05 mole) of 1-diethoxymethylsilyl-4-ethoxydimethylsilylbenzene and 9.1 g. (0.05 mole) of methylphenyldimethoxysilane in 25 ml. of benzene. After stirring for four hours in contact with 5% sulfuric acid, the organic copolymer solution was washed with water to remove all traces of acid. All of the benzene, and traces of water, were then removed by application of vacuum. A thick viscous oil was obtained. A sample of this oil remained fluid for many months at room temperature. A second sample of the thick viscous oil was dissolved in three parts of benzene and the solution was shaken in contact with excess anhydrous potassium carbonate by use of an automatic shaker. After one hour of shaking, a 5 ml. aliquot was withdrawn and the benzene was removed by passing air over the surface. The resulting treated liquid copolymer gelled in three hours at room temperature to form a soft, tack-free, voidless, fully cured thermoset resin body.

After three hours of contact with the anhydrous potassium carbonate, the balance of the solution remaining in the shaker had become a jelly-like mass. At this stage, the anhydrous potassium carbonate could not be separated.

These examples are illustrative of the catalytic effect of anhydrous potassium carbonate on hydrolyzed silicone copolymers containing the unique trifunctional arylene silicon monomer of this invention.

EXAMPLE VII

A thick viscous copolymer oil was prepared by hydrolysis in the exact manner given in Example V. Four samples of the oil, each weighing 7.95 g., and treated as set forth below were placed in separate small crystallizing dishes in a 175° C. oven. Sample 1 was catalyzed by the addition of 0.5 ml. of a solution containing 0.795 g. of potassium hydroxide per liter of isopropyl alcohol. On the resin basis, this corresponds to approximately one potassium ion per 10,000 silicon atoms. Sample 2 was catalyzed by addition of 1 ml. of the potassium hydroxide-isopropyl alcohol solution. Samples 3 and 4 were not catalyzed and served as control samples. Sample 2 gelled in three hours, while the other samples remained liquid. Thus the potassium hydroxide solution catalyzed resinification when present in a ratio of approximately one potassium ion per 5000 silicon atoms on the resin basis. In 18 hours samples 1 and 3 had gelled. Sample 4 gelled several hours later. Thus, it is also evident that polymerization to the thermoset stage can be effected by prolonged heating alone.

Certain electrical properties were measured on the four samples, and are given in Table I.

*Table 1*

ELECTRICAL PROPERTIES OF CROSS-LINKED POLYARYLENESILOXANES

| Sample No. | Catalyst | Temp., °C. | 100×tan $\delta$ | | | Dielectric Constant | | |
|---|---|---|---|---|---|---|---|---|
| | | | 60 c. | 1 kc. | 100 kc. | 60 c. | 1 kc. | 100 kc. |
| 1 | 1K/10,000 Si | 25 | 0.17 | 0.17 | 0.25 | 2.78 | 2.78 | 2.75 |
| | | 100 | 0.14 | 0.24 | 0.45 | 2.84 | 2.84 | 2.73 |
| 2 | 1K/5,000 Si | 25 | 0.16 | 0.16 | 0.16 | 2.81 | 2.81 | 2.81 |
| | | 100 | 0.14 | 0.28 | 0.40 | 2.85 | 2.85 | 2.79 |
| 3 | none | 25 | 0.18 | 0.21 | 0.29 | 2.87 | 2.87 | 2.83 |
| | | 100 | 0.16 | 0.26 | 0.48 | 2.85 | 2.84 | 2.84 |
| 4 | do | 25 | 0.17 | 0.17 | 0.25 | 2.80 | 2.80 | 2.76 |
| | | 100 | 0.19 | 0.31 | 0.47 | 2.85 | 2.83 | 2.79 |

It is evident from the data presented in Table I that these important electrical properties of the resin are not adversely affected by addition of the catalyst.

The copolymers may comprise from 1 to 100 of the groups

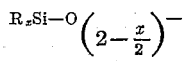

where R represents monovalent hydrocarbon radicals and $x$ has an average value of from 1.8 to 2.2 for each group having the structure

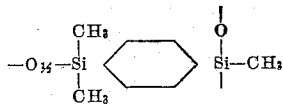

EXAMPLE VIII

Another process for preparing 1-diethoxymethylsilyl-4-ethoxydimethylsilylbenzene comprises the following steps:

A. A mixture consisting of 944 grams (4 moles) of parabromobenzene dissolved in a solution of 1068 grams (6 moles) of methyltriethoxysilane and 2 liters of anhydrous ether was added by rapid drops to an ether slurry containing 125 grams (5 gram atoms) of magnesium turnings, the turnings having been activated previously by reaction with a small amount of paradibromobenzene. After the addition was completed, the mixture was stirred and refluxed for twelve hours. The solution was then filtered to remove the salt solids which had formed and the filtrate was removed to a Claisen distillation apparatus. Ether and unreacted methyltriethoxysilane were stripped from the filtrate and a crude product was fractionally distilled off over the range of 95° C. to 106.5° C. at a pressure of 0.5 mm.

The crude product was then fractionally distilled in a jacketed column equipped with a du Pont head. There was obtained a fraction weighing 480 grams (41.5% yield), boiling at 119° C. at 3 mm. pressure with an $n_D^{25}$ 1.4982, and identified as parabromophenylmethyldiethoxysilane (fraction $a$).

The residue was transferred to a Podbielniak fractionating column and further distilled to give a fraction weighing 125 grams, boiling at 171–2° C. at 11 mm. pressure, with $n_D^{25}$ 1.4618, and identified as 1,4-bis(diethoxymethylsilyl)benzene (fraction $b$).

B. An ethereal solution (4 liters) containing 3 moles of methylmagnesium bromide was added dropwise to a rapidly stirred body comprising 1222 grams (3.57 moles) of 1,4-bis(diethoxymethylsilyl)benzene (fraction $b$). The salt precipitate which formed was removed by filtration and the ether was removed from the filtrate by distillation. The residue was found to be substantially pure 1-diethoxymethylsilyl-4-ethoxydimethylsilylbenzene. This reaction is substantially quantitative.

C. There was added dropwise a solution of 4.7 moles of methylmagnesium bromide in 3 liters of anhydrous ether to 1360 grams (4.7 moles) of parabromophenylmethyldiethoxysilane (fraction $a$). The resulting salt precipitate was removed by filtration and the ether was removed by distillation of the filtrate. By distillation of the residue in a Claisen apparatus there was obtained a 77% yield of a product boiling at 95° C. at 0.5 mm. pressure. This product was further treated in a Podbielniak column to give a 90% yield of parabromophenyldimethylethoxysilane which boiled at 146° C. at 30 mm. and had a refractive index of $n_D^{25}$ 1.5130. This last can be used in the procedure of Example I(B).

It will be apparent that the process of this Example VIII will produce a high overall yield of the desired 1-diethoxymethylsilyl-4-ethoxydimethylsilylbenzene.

The reaction procedure of Example VIII may be applied to produce the chloro derivatives as follows:

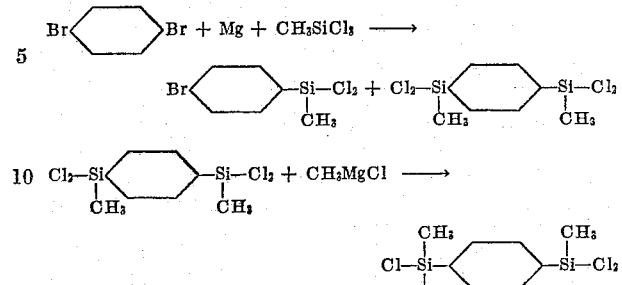

The last product can be hydrolyzed to produce the trisilanol, and then partially condensed to produce a siloxane with hydroxyl groups on the silicon atom at the 4-position of the benzene ring.

It will be apparent that by following the indicated procedure there are produced partially condensed, potentially reactive fluid siloxane polymers and copolymers having no volatile solvent requiring evaporation, and these polymers and copolymers can be applied to members by conventional dipping, impregnation, potting or other processes. The applied liquid siloxanes can be readily cured to solids at low temperatures of the order of 100° C. or even at room temperature without evolution of any solvent vapors or other by-products. The compositions disclosed herein are particularly suitable for treating electrical members by dipping, impregnating, potting, and encapsulating procedures. The addition of a small amount of an alkaline compound such, for example, as potassium hydroxide, sodium hydroxide, lithium hydroxide, cesium hydroxide, sodium carbonate, potassium carbonate, diethyl amine, and ethyl amine or other amine compounds and the alkoxides of the alkali metals such as potassium isopropoxide will catalyze the cross-linking of the polymers through condensation or rearrangement taking place at the silicon atoms having a single hydroxyl group.

The parasilyl arylene compounds of this invention are useful as vulcanizing or cross-linking agents for siloxane elastomers. Thus less than two mole percent of the 1-diethoxymethylsilyl-4-ethoxydimethylsilylbenzene may be incorporated into a dimethyldiethoxysilane, for example, and cohydrolyzed and condensed therewith to produce an oil which when treated with peroxides or other catalysts will form a rubbery gel. After milling fillers into the gel to produce unvulcanized rubber stock therefrom, the stock can be formed into a shaped article such as tubing, and upon moderate heating, with or without an alkaline catalyst, cross-linking through the arylene group will be effected.

Alternatively a dimethylsiloxane gel may be milled with fillers and with the partially condensed, oily product having the groups

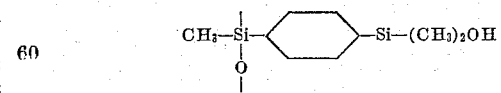

and upon heating the shaped mixture vulcanization is secured by cross-linking effected by condensation through the hydroxyl group on the depicted arylene siloxane.

The partially condensed siloxane compositions disclosed herein may be cast in large sections with or without fillers such as glass fibers, asbestos, mica, silica flour, graphite, and metal powders in producing members for various applications.

The liquid siloxane polymers and copolymers in the partially condensed state may be applied to electrical conductors as coatings or impregnants and then fully cured to a solid thermoset state. The electrical conductor to be treated may be of bare stranded or solid copper or aluminum wire, or it may be wrapped with fibrous or other insulation. Thus glass fiber or asbestos covered wire or strap may be treated with the liquid copolymers. Coils comprising an assembled plurality of layers or turns of glass fiber wrapped conductors wherein the assembled layers or turns are wrapped as a whole with layers of mica tape and a final wrapping of glass fiber tape to provide ground insulation, may be dipped and impregnated in the fluid siloxane copolymers, using vacuum and pressure to fill the interstices of the coils, and the impregnated assembly heat-treated to cure the applied siloxane copolymer to a thermoset solid having both of the groups

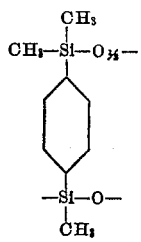

and

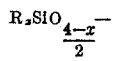

where R represents saturated alkyl and aryl radicals and $x$ has an average value of from 1.8 to 2.2.

In producing useful copolymers, a bifunctional organosilicon monomer may be prepared by the following Grignard reaction:

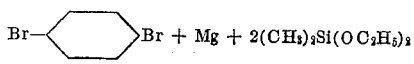

From the reaction there is readily isolated the organosilicon monomer

[1,4-bis(dimethylethoxysilyl)benzene]

This monomer may be hydrolyzed and condensed utilizing conventional hydrolysis procedures as set forth under Examples I and II to form linear polymers having the recurring unit

By cohydrolyzing and condensing from 1 to 100 moles of the 1,4-bis(dimethylethoxysilyl)benzene with one mole 1 - diethoxymethylsilyl - 4 - ethoxydimethylsilylbenzene there is produced a liquid potentially reactive polymer having the following recurring groups:

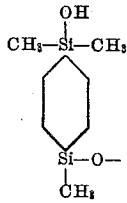

and

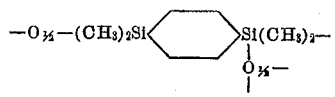

This liquid may be employed as a potting or impregnating composition.

Upon heating and catalysis with an alkaline catalyst, or by adding a substantial amount of alkaline catalyst such as potassium carbonate, the condensation will be completed through the previously unreacted hydroxyl group in the liquid copolymer and thermoset polymers are produced. These polymers will then have the recurring groups:

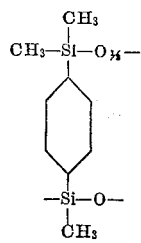

and

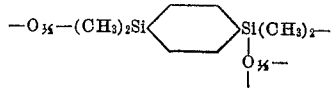

The liquid polymers and copolymers having a plurality of the groups

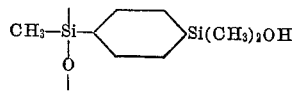

may be substituted for conventional varnishes in treating electrical coils and other members. These liquid polymers and copolymers may be employed in the usual impregnating tanks and with the usual baking cycles used in applying alkyd, phenolic or other varnishes.

Numerous other applications of the compositions disclosed herein will be apparent to those skilled in the art. It is intended that all matter set forth herein be interpreted as illustrative and not limiting.

I claim as my invention:

1. A partially condensed siloxane polymer comprising the recurring group

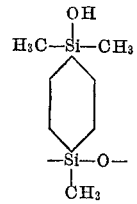

2. A partially condensed siloxane copolymer comprising both of the following groups attached to each other by silicon-oxygen linkages (a)

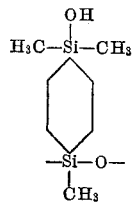

and (b) 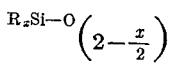

where R is a monovalent hydrocarbon radical and $x$ has an average value of from 1.8 to 2.

3. A partially condensed siloxane polymer comprising a plurality of both of the following groups attached to each other by silicon-oxygen linkages (a)

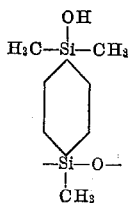

and (b) 

where $R_1$ and $R_2$ are selected from at least one of the group consisting of methyl and phenyl radicals.

4. The siloxane polymer of claim 3, wherein there is present at least 1 and not more than 100 of the (b) 

groups for each of (a) groups.

5. In the process of producing a potentially reactive siloxane polymer, the steps comprising admixing one mol of (a) 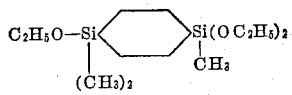

with from one to one hundred mols of (b) 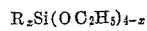

where R is a monovalent hydrocarbon and $x$ has an average value of from 1.2 to 2, subjecting the mixture of (a) and (b) to hydrolysis whereby all of the ethoxyl groups are replaced by hydroxyl groups, the resulting mixed silanols having a differential condensation reactivity in that the pairs of hydroxyl groups on a single silicon atom condense more readily than the single hydroxyl group on the remaining silicon atom of the arylene silanol, condensing the mixture of silanols to condensation under conditions whereby only the pairs of hydroxyl groups condense, thereby to provide a fluid polymer having present selected silicon atoms each with a single hydroxyl group.

6. The process of claim 5 wherein the (b) ethoxide consists essentially of the diethoxide and the radicals R are selected from at least one of the group consisting of methyl and phenyl radicals.

7. In the process of preparing members, the steps comprising introducing an alkaline catalyst into a fluid polymer comprising both (a) 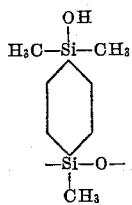

and (b) $R_2Si$—O— groups the (a) and (b) groups being interlinked by Si—O—Si linkages, there being from one to one hundred of the (b) groups for each (a) group, the alkaline catalyst effecting cross-linking through condensation at the SiOH group in the (a) group, whereby the fluid polymer thermosets.

8. The process of claim 7 wherein the alkaline catalyst comprises a potassium compound providing at least one potassium atom per 5000 silicon atoms.

9. A thermoset siloxane polymer comprising the recurring unit

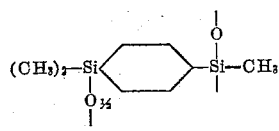

the polymer having Si—O—Si linkages.

10. A thermoset polymer comprising both of the following recurring units (a) 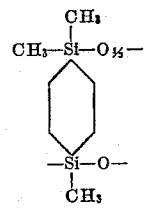

and (b) 

where $R_1$ and $R_2$ are monovalent hydrocarbon radicals, the units (a) and (b) being interlinked by Si—O—Si linkages, and there is present from one to one hundred of the (b) units for each (a) unit.

11. The compound 1-diethoxymethylsilyl-4-ethoxydimethylsilylbenzene.

12. The process comprising admixing parabromophenyldimethylethoxysilane, methyltriethoxysilane and magnesium and heating to produce 1-diethoxymethylsilyl-4-ethoxydimethylsilylbenzene, and separating the latter from the mixture.

13. A siloxane copolymer having the recurring units:

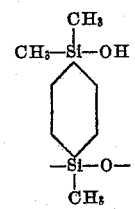

and

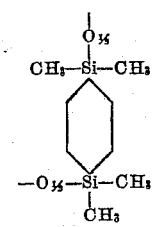

14. A thermoset copolymer having the recurring units

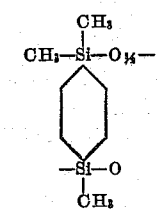

and

the units being interlinked with one another by Si—O—Si linkages.

15. An insulated conductor comprising, in combination, a conductor and insulation applied to the conductor, the insulation comprising a fully cured, thermoset siloxane copolymer, the copolymer having both of the following recurring groups:

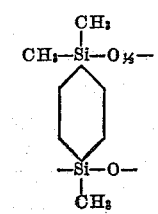

and $$R_xSi-O_{\frac{(4-x)}{2}}$$

where R represents a monovalent radical selected from at least one from the group consisting of saturated alkyl and aryl radicals and $x$ represents an average value of from 1.8 to 2.2.

16. The insulated conductor of claim 15 wherein the insulation comprises a wrapping of glass fibers and the thermoset siloxane copolymer impregnates the wrapping of glass fibers.

17. The insulated conductor of claim 15 wherein the insulation comprises mica wrapped on the conductor and the thermoset siloxane impregnates the mica wrapping.

18. The process comprising admixing and reacting paradibromobenzene, magnesium and methylsilicontriethoxide to produce a reaction product comprising (a) parabromophenylmethyldiethoxysilane and (b) 1,4-bis-(methyldiethoxysilyl)benzene, separating components (a) and (b) and admixing and reacting each with methylmagnesium halide whereby the first produces parabromophenyldimethylethoxysilane and the latter 1-diethoxymethylsilyl-4-ethoxydimethylsilylbenzene.

References Cited in the file of this patent

UNITED STATES PATENTS 2,557,931    Barry _____ June 26, 1951

OTHER REFERENCES

Gruttner, Berichte Deut. Chem. Gesell.; vol. 51, 1918, pp. 1283 to 1292.